United States Patent [19]

Olson

[11] Patent Number: 4,600,640

[45] Date of Patent: Jul. 15, 1986

[54] THERMOPLASTIC RESINOUS SUBSTRATES HAVING AN EXTERNAL THIN GLASS SHEET PROTECTIVE LAYER

[75] Inventor: Daniel R. Olson, Schenectady, N.Y.

[73] Assignee: General Electric Company, Pittsfield, Mass.

[21] Appl. No.: 639,709

[22] Filed: Aug. 13, 1984

[51] Int. Cl.$^4$ ...................... B32B 27/30; B32B 27/38; B32B 17/10
[52] U.S. Cl. ..................... 428/332; 428/412; 428/415; 428/442; 428/424.4; 428/425.6
[58] Field of Search .................. 428/424.4, 425.6, 332, 428/412, 415, 442

[56] References Cited

U.S. PATENT DOCUMENTS

| | | | |
|---|---|---|---|
| 3,508,987 | 4/1970 | Burkley et al. | 156/99 |
| 3,666,614 | 5/1972 | Snedeker et al. | 161/183 |
| 4,027,072 | 5/1977 | Molari, Jr. | 428/412 |
| 4,184,030 | 1/1980 | Dudinyak | 428/442 |
| 4,190,681 | 2/1980 | Hall et al. | 417/45.1 |
| 4,200,681 | 4/1980 | Hall et al. | 428/412 |
| 4,201,828 | 5/1980 | Triebel et al. | 428/442 |
| 4,242,414 | 12/1980 | McKenzie | 428/483 |
| 4,246,391 | 1/1981 | Watson, Jr. | 528/49 |
| 4,312,903 | 1/1982 | Molari, Jr. | 428/442 |

FOREIGN PATENT DOCUMENTS

| | | | |
|---|---|---|---|
| 1101202 | 1/1968 | United Kingdom . | |
| 2015427 | 9/1979 | United Kingdom | 428/442 |

OTHER PUBLICATIONS

Hertl, W., Microsheet Glass Coated Plastics, 20th Anniversary Technical Conference, Reinforced Plastics/Composites Institute, The Society of the Plastics Industry, Inc. 1975, Section 9-G.

*Primary Examiner*—P. C. Ives
*Attorney, Agent, or Firm*—John W. Harbour; William F. Mufatti; Edward K. Welch, II

[57] ABSTRACT

An abrasion and chemical solvent resistant thermoplastic article is disclosed which has a protective layer of thin glass from about 0.3 mils to about 20 mils in thickness bonded to a thermoplastic substrate by a UV cured adhesive interlayer.

9 Claims, No Drawings

THERMOPLASTIC RESINOUS SUBSTRATES HAVING AN EXTERNAL THIN GLASS SHEET PROTECTIVE LAYER

This invention relates to thermoplastic resinous laminates having exceptional scratch, mar, and chemical solvent resistance. More particularly, this invention relates to thermoplastic resinous substrates having thin glass adhered to at least one external surface by a UV cured adhesive interlayer. Such laminates are characterized by exceptional scratch, mar, and chemical solvent resistance, by a lack of residual stresses at room temperature or the chosen temperature of UV cure, by excellent impact resistance, and by their light weight. Such laminates combine the excellent properties of both glass and resinous thermoplastic to produce a single item having the above properties.

BACKGROUND OF THE INVENTION

Thermoplastic resinous sheets or laminates having external thermoplastic surfaces, especially polycarbonate external surfaces, are well known and commercially available materials. Such laminates or sheets can be engineered to possess a wide variety of chemical and physical properties. In many instances, items manufactured from these laminates or sheets are more break resistant at a lighter weight than glass and thus are used as a substitute for glass, as for example, in the manufacture of taillights, protective shields for street lights, safety shields in inspection windows, windshields, windows, and the like. However, though there are many advantages in the use of thermoplastic resins, glass remains far superior to such materials in the surface characteristics of mar and chemical solvent resistance.

In one line of development, the problems inherent to these poor surface characteristics have been remedied by incorporating thermoplastic laminae into a laminate with external laminae of glass. Such laminates benefit from both the mar resistance and strength of glass as well as the toughness of thermoplastic.

U.K. Pat. No. 2015427 discloses an in situ UV cure of the adhesive interlayer in glass-thermoplastic laminates. Such laminates as disclosed contain a substantial portion of their bulk in glass, thereby depriving the laminates to some degree of qualities of light weight and toughness which purely resinous laminates possess.

U.S. Pat. No. 3,666,614 discloses a laminate having a central lamina of polycarbonate and external laminae of glass bonded through adhesive interlayers such as polyvinylbutyral and the like. As above, these laminates contain a substantial portion of their bulk as glass and therefore become proportionately heavier and less shock resistant.

In another line of development, the poor surface characteristics of thermoplastic laminates and sheets have been improved by use of thin protective layers of various organic and inorganic coatings. These protective coatings have substantially improved the mar and chemical solvent resistance of many resinous materials, but further improvement is still necessary.

U.S. Pat. No. 4,200,681 which is assigned to the same assignee as the present invention discloses a polycarbonate article having deposited on the surface thereof (i) an intermediate primer layer containing the photoreaction products of certain polyfunctional UV cured acrylic monomers; and (ii) a top layer of vapor deposited silicon dioxide. This article, while an improvement over the prior art, suffers from a degree of erratic adhesion and crack resistance in the vapor deposited silicon dioxide coat.

Thus, while thermoplastic laminates and sheets exist which have relatively good or excellent surface characteristics of mar and chemical solvent resistance, such laminates or sheets suffer from either the increased bulk of external glass laminae or the reduced mar and chemical solvent resistance of thin protective coatings.

Therefore, it is an object of the present invention to provide mar and chemical solvent resistant thermoplastic sheets or laminates, which thermoplastic sheets or laminates have adhered to at least one surface thereof a thin sheet of glass bonded by a UV cured adhesive.

It is yet another object of the present invention to provide mar and chemical solvent resistant polycarbonate sheets or laminates, which polycarbonate sheets or laminates have adhered to at least one surface a thin sheet of glass bonded by a UV cured acrylated urethane interlayer or UV cured epoxy.

DESCRIPTION OF THE INVENTION

Briefly, according to the present invention, it has been found that greatly improved mar and chemical solvent resistance are exhibited by thermoplastic resinous substrates, such as for example, thermoplastic sheets or external thermoplastic laminae where a sheet of thin glass is adhered thereto by a UV cured adhesive interlayer. The thin glass of the present invention may range from about 0.3 mil to about 20 mils in thickness. The thermoplastic resinous substrate may be chosen from the many such substrates now employed in uses which require chemical solvent or scratch resistance, but preferably, the thermoplastic substrate is polycarbonate or polymethacrylate. Likewise, many suitable UV curable adhesive interlayers exist which are suitable for use herein.

Suitable thermoplastic resinous substrates which may be used include acetal homopolymers; acetal copolymers produced by polymerization of trioxane and ethylene oxide; epoxy resins; polycarbonates; polyetherimides; phenylene oxide based resins such as polyphenylene oxide and blends of polyphenylene oxide and styrene resins; polyaryl ethers; polyesters; polyethylenes; polyphenylene sulfides; polypropylene; polysulfones; ethylene polymers such as ethyl vinyl acetates; conductive plastics and ordered aromatic copolymers, etc. These thermoplastic resinous materials can be formed into sheets.

As stated above, the substrate is preferably a thermoplastic resinous polycarbonate, particularly an aromatic polycarbonate. These are homopolymers and copolymers and mixtures thereof that are prepared by reacting a dihydric phenol with a carbonate precursor. Suitable dihydric phenols of the bisphenol type are available and disclosed in U.S. Pat. Nos. 2,999,835, 3,028,365 and 3,334,154 which are incorporated herein by reference.

Polymethacrylate resins are common as sheet or in laminates as external thermoplastic resinous laminae. Suitable methacrylic resins herein embrace those polymers or resins resulting from the polymerization of one or more methacrylates such as, for instance, methyl methacrylate, ethyl methacrylate, butyl methacrylate, hexyl methacrylate, etc. Copolymers of acrylic and methacrylic monomers are also included within the term acrylic resin as it appears herein. The polymerization of the monomeric acrylates and methacrylates to provide the polyacrylate resins useful in the practice of the invention may be accomplished by any of the well known polymerization techniques. A preferred acrylic resin is poly(methylmethacrylate).

Suitable thin glass is presently in production and may be obtained commercially. Thin glass is made by a draw down process in various thicknesses ranging from about 3 mils to about 20 mils. Pilot plant processes have produced such glass in thicknesses down to 0.3 mils. Though the above method is currently used to produce thin glass and the above thicknesses are available on the market the scope of the invention is in no way intended to be restricted by them. Any thin glass having a thickness of from about 0.3 mil to about 20 mil is suitable.

Suitable UV cured adhesive interlayers are the photoreaction products of any commonly used solventless UV curable adhesive. It is a requirement that the cured adhesive be generally flexible and that the uncured adhesive have a sufficiently low viscosity so as to flow easily. From the physical limitations of the application, it is understood that the adhesive may not be cured in the presence of a solvent, that by-products such as water or gas may not be generated during the cure, and that the adhesive must be compatible with the underlying substrate. However, while those skilled in the art may imagine other solventless UV curable adhesives meeting the above requirements, the photosensitized acrylates, the photosensitized epoxies, and the photosensitized thiol-enes are preferred.

Suitable acrylates or methacrylates of the adhesive interlayer, are homopolymers, copolymers, terpolymers, etc., of acrylic or methacrylic monomers which may additionally contain cross-linking copolymers including (1) polyfunctional acrylic or methacrylic monomers with a polyvalent hydrocarbon ester group and/or (2) polyfunctional acrylic or methacrylic modified polymeric monomers wherein unbranched or branched polymer chains are terminated with functional acrylic or methacrylic end groups or mix or mixtures thereof. Additionally, minor amounts of other aliphatically unsaturated organic monomers such as vinyl or allyl monomers may be present.

Suitable cross-linking polyfunctional acrylic or methacrylic monomers with polyvalent ester groups of class (1) above are represented by the general formula:

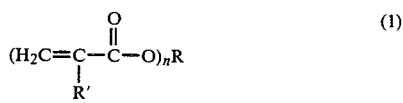
(1)

wherein n is an integer having a value of 2,3,or 4; R has less than 20 carbons and is selected from the group consisting of n valent aliphatic organic residue, n valent organic residue having a cycloaliphatic constituent, and n valent organic residue having an aromatic constituent; and R' is selected from the group consisting of a methyl radical or hydrogen. For example, a preferred diacrylate is 1,6 hexanediol diacrylate, a suitable triacrylate is pentaerythritol triacrylate, and a suitable tetraacrylate is pentaerthritol tetraacrylate.

Preferred polyfunctional acrylic or methacrylic monomers of Formula 1 are represented by the general formula:

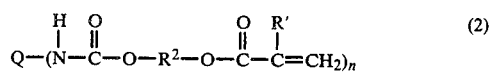
(2)

wherein Q is n valent organic residue selected from $C_{(1-18)}$ aliphatics, $C_{(3-12)}$ cycloaliphatics, and $C_{(6-18)}$ aromatics; R' is hydrogen or a methyl radical; $R^2$ is an alkylene and n is 2,3, or 4. Radicals included by Q of Formula (2) are, for example, alkylene radicals, such as ethylene, hexamethylene, etc.; arylene, such as phenylene, tolylene, xylylene, etc.; radicals included by $R^2$ are, for example, methylene, ethylene, propylene, etc.

Suitable polyfunctional acrylic or methacrylic modified polymeric monomers of class (2) above are branched or unbranched polyesters, polyethers, polyamines, polyimides, polyamides, polycarbonates, polyurethanes, epoxies, etc. having at least two terminal acrylic or methacrylic functional groups. These modified polymeric monomers are represented by the general formula:

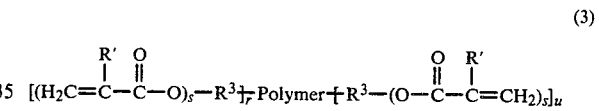
(3)

wherein "Polymer" is a polyvalent polyester, polyether, polyamine, polyimide, polamide, polycarbonate, polyurethane, polyepoxide, etc.; $R^3$ is polyvalent $C_{(1-10)}$ organic radical; r and u are integers having a value of from 1 to 3, provided the sum does not exceed 5; and s is 1, 2, or 3. For example, typical acrylic or methacrylic modified polymers, wherein the acrylate end group is a monoacrylate, are acrylate polyesters represented by the formula:

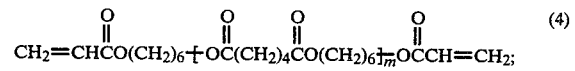
(4)

acrylate epoxies represented by the formula:

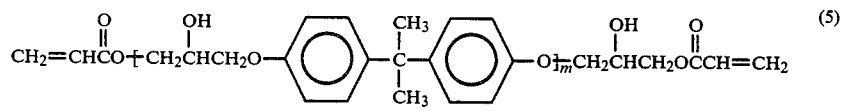
(5)

and acrylate urethanes represented by the general formula

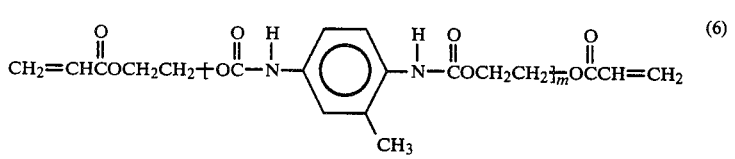
(6)

wherein m is 1 to 100 or more.

Preferred polyfunctional acrylic or methacrylic modified polymeric monomers are those wherein $R^3$ of Formula (3) contains a urethane linkage. These modified polymeric monomers may be represented by the general formula:

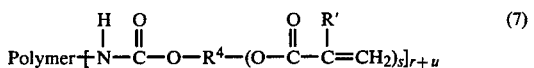  (7)

wherein r,s,u, and "Polymer" are defined above and $R^4$ is a $C_{(1-9)}$ polyvalent aliphatic organic radical.

The major constituent of the UV curable acrylic composition in the instant invention, are acrylic and methacrylic monomers. Suitable such monomers are represented by the general formula:

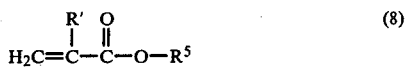  (8)

wherein R' is defined above, and $R^5$ is a monovalent aliphatic organic radical. For example, $R^5$ may be a lower ($C_1$–$C_{20}$) alkyl acrylic ester or mixtures thereof, e.g. methyl acrylate, ethyl acrylate, methyl methylacrylate, ethyl methacrylate. Included within $R^5$ are also epoxide, carboxyl, hydroxy, etc., ester groups if no crosslinking is present.

Preferred among the suitable acrylic and methacrylic monomers are those monomers wherein the ester group contains a urethane linkage. These monomers are represented by the general formula:

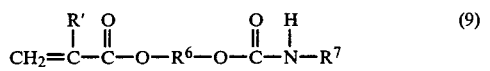  (9)

wherein R' is given above; $R^6$ is selected from $C_{(1-8)}$ alkylene, for example methylene, ethylene, propylene etc.; and $R^7$ is selected from $C_{(1-18)}$ aliphatic radicals and $C_{(6-18)}$ aromatic radicals, for example alkyl radicals, such as methyl, ethyl, propyl, butyl, etc. and aryl radicals, such as phenyl, xylyl, tolyl, etc. Particularly useful and preferred acrylates of Formula (9) are N-n-butylacryloxyethyl carbonate, 2-acryloxyethyl N-phenyl carbonate, 2-methacryloxypropyl N-phenyl carbonate, 2-acryloyloxypropyl N-phenyl carbonate, etc.

Suitable UV radiation photosensitizers for the acrylics are well known. Some non-limiting examples of these UV radiation photosensitizers include ketones, such as benzophenone, acetophenone, benzil, benzyl methyl ketone; benzoins and substitute benzoins such as benzoin methyl ether, alpha-hydroxymethyl benzoin isopropyl ether; halogen containing compounds such as alpha-bromoacetophenone, p-bromoacetophenone, alpha-chloromethylnaphthalene; sulfur compounds such as aromatic disulfides; and other photosensitizers such as azides, thioketones, or mixture or synergistic mixtures thereto; the diaryl peroxides; the hydroperoxides; the peracids and peresters; and azo compounds; or any other known free radical initiator, such as di-t-butyl peroxide, benzoyl peroxide, 2,4-dichlorobenzoyl peroxide, t-butyl hydroperoxide peroxyacetic acid, peroxybenzoic acid, t-butyl peracetate, azobisisobutyronitrile, and the like.

The epoxy resins of the present invention are homopolymers copolymers, terpolymers, etc. of the photopolymerization products of monofunctional epoxy monomers, with polyfunctional epoxy monomer cross linking agents. The functional epoxy groups are usually present on the monomer as a glycidyl epoxy group, a cycloaliphatic epoxy group, a vinyl epoxy group, an internal epoxy group, or a methyl glycidyl epoxy group. Preferred functional epoxy groups are the glycidyl epoxy group, the cycloaliphatic epoxy group, and the vinyl epoxy group.

Suitable polyfunctional epoxy monomer cross linking agents are polyfunctional epoxy organic molecules or epoxy terminated branched or unbranched polymer chains. The epoxy terminated polymer chains are, for example, epichlorohydrin—BPA resins, glycidyl ether terminated diol-diisocyanate resins, polyethylene oxide diglycidyl ether, polypropyleneoxide diglycidyl ether, bisepoxy dicylcopentyl succinate, cresol-novolac epoxy resins, etc. The polyfunctional epoxy organic molecules are, for example: cycloaliphatic epoxides, such as vinyl cyclohexene dioxide, bis(3,4-epoxy-6-methylcyclohexylmethyl) adipate, 3,4-epoxycyclohexylmethyl-3,4-epoxycyclohexane carboxylate, etc; aliphatic polyepoxides, such as the diglycidyl ethers or diglycidyl esters resulting from the reaction of for example ethylene glycol, propylene glycol, 1,6 hexanedicarboxylic acid, etc. with epichlorohydrin; and aromatic polyepoxides, such as the diglycidyl ether of 2,2'-bis(4,4'dihydroxyphenyl)propane, the diglycidyl ester of terephthalic or isophthalic acid, triglycidyl isocyanurate, etc.; etc.

The major portion of any epoxide adhesive interlayer composition of the present invention are the monofunctional epoxies. These monofunctional epoxies may have any of the above named epoxide functional groups attached to either an aliphatic or aromatic hydrocarbon radical. Preferably, the monofunctional epoxies are alpha-olefin oxides of the general formula:

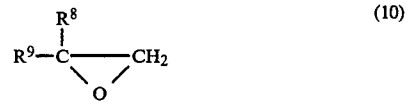  (10)

wherein $R^8$ is methyl or hydrogen and $R^9$ may be hydrogen, a $C_{(6-48)}$ aromatic organic radical, but is preferably a $C_{(1-30)}$ aliphatic organic radical. Preferred monofunctional epoxide monomers of Formula (10) are, for example,

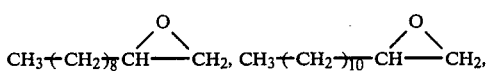

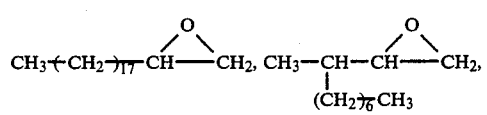

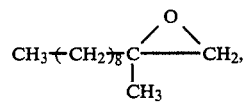

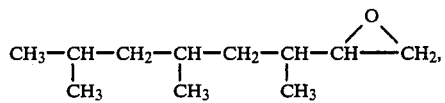

-continued

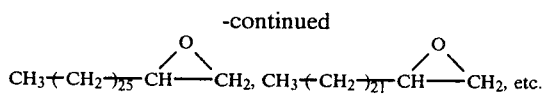

Although other UV sensitizers may be known, suitable UV sensitizers for use with the epoxies are disclosed in U.S. Pat. Nos. 4,319,974, 4,407,759, 4,250,311, 4,264,703, 4,310,469 assigned to the same assignee as the present invention. These disclosures are incorporated herein by reference.

In addition to the above epoxy and acrylic resins suitable for use in the practice of this invention are the thiol-enes, some of which are shown by Kerr et al., in U.S. Pat. Nos. 3,697,395; 3,697,396; 3,697,402; 3,700,574; and 3,661,744 which are incorporated herein by reference. The thiol-ene resins can be cured by the use of such photoinitiators as, for example, benzophenone, acetaphenone, dibutyl ketone, etc.

Acrylic, epoxy, or thiol-ene adhesive interlayer compositions may be prepared from the above suitable acrylic monomers, the above preferred urethane ester acrylic monomers, the above epoxy monomers, or the above thiol-enes according to methods well known to the art. Each class of monomers are blended with an appropriate UV initiator and optional additives discussed below to form a generally homogenous composition. The selection of particular monomers and ratios of monomers, photoinitiators, and additives lies within the skill of the art for meeting the criterion of low viscosity in the uncured composition, flexibility in the cured composition, and good adhesive properties. The viscosity of the uncured composition should be low enough to allow for application of the thin glass to the substrate and the flexibility of the cured adhesive must be sufficient to retain impact strength and adhesion in the finished laminate. In general, to achieve these objectives, non-crosslinking monomers should constitute the majority of any UV curable adhesive composition.

The adhesive interlayer compositions of the instant invention may also optionally contain various surface active agents, thixotropic agents, and UV light absorbers. All of these additives and the use thereof are well known in the art and do not require extensive discussions. It is understood that any compounds possessing the ability to function in such a manner, i.e., as a surface active agent, UV light absorber, and the like, can be used so long as they do not deleteriously affect the photocuring of the primer compositions and do not adversely affect the non-opaque character of the coated polycarbonate article.

The various surface-active agents, including anionic, cationic and nonionic surface-active agents are described in Kirk-Othmer Encyclopedia of Chemical Technology, Vol. 19, Interscience Publishers, New York, 1969, pp. 507-593, and Encyclopedia of Polymer Science and Technology, Vol. 13, Interscience Publishers, New York 1970, pp. 477-486, both of which are references and incorporated herein.

As stated above, suitable ultraviolet light absorbing compounds may be added to the UV curable adhesive interlayer composition in an effective amount to protect a sensitive substrate from the degradative effects of ultraviolet light, provided they do not unduly interfere with or hinder the photocure of the adhesive interlayer composition. Although the benzophenones and benzotriazoles may be used in controlled amounts, the latent ultraviolet light absorbers are preferred. Some non-limiting examples of suitable latent ultraviolet light absorbing compounds are the salicylates, such as, p-octylphenyl salicylate, phenyl salicylate, t-butyl phenyl salicylate, and the like, and the monobenzoates, such as, resorcinol monobenzoate and the like.

In the practice of the instant invention, the photocurable compositions are first compounded by adding together the monomer mixture, the UV photoinitiator, and optionally, any of the aforementioned additives. The various components are thoroughly mixed to form a generally homogenous adhesive interlayer composition. A thin, uniform film of the solution is then applied onto a substrate such as polycarbonate sheet by any of the known means such as dipping, spraying, roll-coating, and the like. Generally, the adhesive layer composition is applied in an amount sufficient to provide a cured film or layer of from about 0.1 mils to about 10 mils in thickness.

Thin glass is laid on to the uncured adhesive composition by any suitable method. A sufficiently low viscosity of the adhesive interlayer allows air bubbles, and excess adhesive to be easily removed. Also, such low viscosity of the adhesive interlayer composition provides for minimal stresses on the glass during its application. During laying on, a large or especially thin sheet of the glass must be supported or otherwise specially handled during its application to the uncured adhesiVe interlayer. This may involve the optional use of a UV transparent supportive backing lightly adhered to the glass on the side opposite the uncured adhesive interlayer.

Alternatively, the uncured adhesive interlayer may be injected between a spaced arrangement of thin glass on a supportive backing and the thermoplastic resinous substrate. Such a method for thick glass is described in G.B. Pat. No. 2015427 which is incorporated herein by reference.

The composite of thermoplastic resinous substrate, adhesive interlayer composition, and thin glass with optional supportive backing is subjected to UV radiation in such a way that the uncured adhesive interlayer is irradiated through the thin glass. Although the uncured adhesive interlayer may also be irradiated through a suitable UV transparent resinous substrate, many such substrates are sensitive to UV radiation and others may not be transparent to the UV radiation.

Suitable UV irradiation can have a wavelength of from 2537 A. to 4000 A. The lamp systems used to generate such radiation may be an ultraviolet lamp which may be any discharge lamp, as for example, xenon, metallic halide, metallic arc, low or high pressure mercury vapor discharge lamps etc., having generating pressure of from as low as a few milli-torr up to about 10 atmospheres, can be employed.

A lightly adhered supportive backing prevents the fragile glass from breaking or shattering during lay on and is subsequently removable from the surface of the thin glass following cure of the adhesive interlayer. The supportive backing must be easily removable following cure by either mechanical or chemical means, flexible to facilitate the application of the glass to the uncured adhesive interlayer, and transparent to UV radiation to permit the UV cure of the adhesive interlayer through the thin glass. The supportive backing may be an organic sheet which is inherently tacky or has an organic adhesive coat on at least one side such as a contact adhesive sheet or it may be a backing applied to the thin sheet glass as a liquid and subsequently hardened by either polymerization, crosslinking, evaporation of a solvent, or any combination thereof to a highly viscous of flexible but solid state.

Suitable supportive backings are sheets of polymeric materials, cellophane, glass, and others. Suitable organic adhesive coats applied to such sheets when necessary to provide tackiness are the siloxanes, epoxies and the acrylics. These and other suitable adhesives for such use are disclosed in the Handbook of Adhesives, 2nd Edition, Van Nostrand Reinhold Company, New York, N.Y., 1962, which is incorporated herein by reference.

Suitable supportive backing for application to the thin glass as a liquid may be any UV transparent organic substance which will adhere to the glass and dry, polymerize, or crosslink to a highly viscous or flexible but solid state thereby providing support to the glass during subsequent processing.

PREFERRED EMBODIMENT OF THE INVENTION

Thus, has been described a thermoplastic resinous article exhibiting exemplary mar and chemical solvent resistance as well as the manner and process of making and using the same. In order to more fully and clearly illustrate the invention, the following specific examples are presented. It is intended that the examples be considered as illustrative rather than limiting of the invention disclosed and claimed herein.

EXAMPLE 1

Hydroxyethyl acrylate (47 g, 0.4 moles), butyl isocyanate (40 g, 0.4 moles), dibutyltin dilaurate (0.01 g) and t-butyl catechol (0.1 g) were combined and stirred at 75° C. for 7 hours to give N-n-butyl-acryloxyethyl carbamate (HEABI). Infrared absorptions (thin film) at 3.0 and 5.83u.

EXAMPLE 2

A UV-curable adhesive interlayer composition was made by combining 10 pbw of HEABI from Example 1 with 0.1 pbw of diethyoxyacetophenone.

EXAMPLE 3

A layer of thin glass manufactured by Corning Glass of Elmira, N.Y. was bonded to a Lexan resin polycarbonate sheet by (1) placing a (6"×6" piece of 2 mil thin glass on a glass plate, (2) placing a portion of UV-curable composition from Example 2 on the thin glass, (3) placing a 4"×4"×¼" Lexan sheet panel on the curable composition, (4) squeezing out and removing excess UV-curable composition so that no bubbles remain, and (5) curing in a Model 1202AN PPG UV Processor at a belt speed of 20' min in a nitrogen flow of 20 standard cubic ft/min by placing the sample with the glass facing up. Excess glass was trimmed from the edges.

EXAMPLE 4

The surface protected polycarbonate sheet from Example 3 was tested for adhesion by scribing the glass with a 1 mm Gitterschnittprufgerat crosshatch adhesion cutter, applying Mystik 6432 tape to the crosshatched area, and rapidly pulling the tape away from the scribed area. The glass was not removed by the tape.

EXAMPLE 5

The sample from Example 3 was tested for impact resistance by impacting the side away from the glass (reverse impact) in a Gardner Falling Dart Tester set at 320 in-lbs. Although the glass cracked, it remained bonded to the polycarbonate. The polycarbonate was ductile and had no cracks in this test.

EXAMPLE 6

The sample from Example 3 was tested for abrasion resistance using 1000 cycles of abrasing on a Model 174 Taber Abraser equipped with CS-10F wheels and 500 gm weights. The difference in haze after Taber abrasing, measured using a Gardner Model UX10 Hazemeter, was found to be 1.2%. The glass surface was not subject to scratching by sharp objects.

EXAMPLE 7

The procedure of Example 3 was repeated to make a surface protected polycarbonate sheet except 10 pbw of HEABI from Example 2 containing 0.5 pbw of resorcinol monobenzoate was used.

EXAMPLE 8

The procedure of Example 7 was repeated to make a surface protected polycarbonate sheet except 10 pbw of HEABI from Example 2 containing 1 pbw of resorcinol monobenzoate was used as the adhesive interlayer.

EXAMPLE 9

A UV-curable adhesive composition was made by combining 10 pbw of HEABI from Example 1 with 0.2 pbw benzophenone and 0.2 pbw methyldiethanol amine.

EXAMPLE 10

A 10 mil sheet of thin glass manufactured by Corning Glass of Elmira, N.Y. was bonded to a LEXAN resin polycarbonate sheet by the steps of (1) adhering to the thin glass from a solvent spray a 1-2 mil layer of a UV transparent polymer, sold under the name Krylon by Borden, Inc. of Columbus, Ohio; (2) cutting the thin glass to dimensions; (3) applying to one side of the polycarbonate sheet a film of the uncured adhesive composition of Example 9; (4) laying on to the uncured adhesive the thin glass sheet in such a way as to expel the air and form a composite with the UV transparent polymer on an external face; (5) curing the adhesive by UV irradiation in a Model 1202AN PPG UV Processor at a belt speed of 20' min in a nitrogen flow of 20 standard ft$^3$/min by placing the composite with the glass facing up; and (6) removing the UV transparent polymer from the thin glass by applying isopropanol and scraping the swollen polymer away with a razor blade. The resulting laminate was 14" by 18" in size.

While the invention has been described above with particularity, it will, of course, be apparent that modifications may be made which, pursuant to the patent statutes and laws, do not depart from the scope of the instant invention.

What is claimed is:

1. An article comprising thermoplastic substrate bonded by a UV cured adhesive interlayer on at least one surface to a laid on sheet of thin glass which glass has a thickness of from about 0.3 mil to about 10 mils.

2. The article of claim 1 wherein said thermoplastic resinous substrate is polycarbonate.

3. The article of claim 1 wherein said thermoplastic resinous substrate is polymethylmethacrylate.

4. The article of claim 1 wherein said adhesive interlayer is a UV cured polyacrylate.

5. The article according to claim 4 wherein said polyacrylate ester contains a urethane linkage.

6. The article of claim 1 wherein said adhesive interlayer is a UV cured epoxy resin.

7. The article of claim 1 wherein said resinous substrate is a sheet.

8. The article of claim 1 wherein said resinous substrate is the external lamina of a laminate.

9. The article of claim 1 wherein said UV cured adhesive interlayer contains a UV light absorbing compound.

* * * * *